United States Patent [19]
Horton

[11] Patent Number: 5,335,439
[45] Date of Patent: Aug. 9, 1994

[54] CASTABLE HARPOON APPARATUS

[76] Inventor: Randolph Horton, 2506 Coles St., Richmond, Va. 23234

[21] Appl. No.: 158,312

[22] Filed: Nov. 29, 1993

[51] Int. Cl.⁵ .................................................. A01K 81/00
[52] U.S. Cl. ............................................. 43/6; 43/18.1
[58] Field of Search ............... 43/4, 4.5, 5, 6, 6.5, 43/18.1, 19

[56] References Cited

U.S. PATENT DOCUMENTS

| | | | |
|---|---|---|---|
| 2,305,176 | 12/1942 | Littman | 43/19 |
| 3,532,375 | 10/1970 | Heartness | 294/61 |
| 3,614,947 | 10/1971 | Feldman | 43/6 |
| 3,742,637 | 7/1973 | Badovinac | 43/19 |
| 3,766,678 | 10/1973 | Reaves | 43/6 |
| 3,932,953 | 1/1976 | Sharp | 43/6 |
| 4,854,067 | 8/1989 | Tersiev | 43/6 |
| 4,895,128 | 1/1990 | Okado | 124/22 |
| 4,971,019 | 11/1990 | Zacker | 124/22 |
| 5,145,740 | 9/1992 | Boykin | 428/371 |
| 5,163,242 | 11/1992 | Smith | 43/6 |

*Primary Examiner*—P. Austin Bradley
*Assistant Examiner*—James Miner
*Attorney, Agent, or Firm*—Norman B. Rainer

[57] ABSTRACT

An apparatus for spearfishing includes a fishing rod having a whip-like casting portion and a rigid handle section that secures a reel which holds a spirally wound line. The free extremity of the line is attached to a collar having a centered bore. A spear is slidably engaged by the bore of the collar. The spear includes a shaft having a barbed forward extremity, and a rearward extremity having stabilizing flights or feathers. Forward and rearward stops positioned on the shaft serve as abutments to limit sliding travel of the collar. The spear is intended to be cast forwardly, during which action the collar rests upon the forward stop. When the spear is retrieved, the collar rests against the rearward stop.

3 Claims, 1 Drawing Sheet

CASTABLE HARPOON APPARATUS

BACKGROUND OF THE INVENTION

1. Field of the Invention

This invention relates to fishing harpoons and more particularly concerns an apparatus and method adapted to propel and retrieve a pointed spear tethered to a fishing rod and reel.

2. Description of the Prior Art

Numerous spears and harpoons have been disclosed in the prior art. Various throwing harpoon devices have been employed in attempts to impale fish and other game. The concept of a thrown spear has been well known since pre-historic times. More recently have tethered spears and harpoons been introduced. For example, U.S. Pat. No. 3,532,375 to Hearthess discloses an improved harpoon having leading and trailing portions with a wire cable stored in the leading portion and having one end connected to the leading portion and the other end connected to the trailing portion. The harpoon has means to separate the trailing portion and eject a floating marker buoy from within the trailing portion to float to the surface of the water. The tether wire is adapted to deploy allowing for the locating and retrieval of the harpoon and the impaled object or game. U.S. Pat. No. 5,163,242 to Smith discloses a similar spear having forward and rear tubular sections separable and connected by a spring member. The Smith spear is adapted to separate in order to prevent the impaled game from ejecting the spear by body movement, however, the spring means is not employed to withdraw the spear.

Another tethered harpoon is disclosed in U.S. Pat. No. 3,766,678 to Reaves. The Reaves harpoon is comprised of a gaff or blade element having a shank slidably fitted into one end of an elongate tubular handle, and detachably connected to a flexible element extending from the other end of the handle and adapted to have its extremity anchored. When a sea creature is harpooned or gaffed, the flexible element can slide outwardly through the tubular handle to the limit of movement provided by the anchoring of the flexible element. The element may then be withdrawn by the flexible element.

Various spear propelling and retrieving devices have been used by sport divers, archers and spear fishermen. Such devices have included spear guns, bow fishing outfits, pole-spears, and Hawaiian slings. For example, U. S. Pat. No. 4,895,128 to Okada discloses an underwater spear gun adapted to propel an elongate tethered spear by means of a tensioned rubber band. The spear is connected to one end of the flexible tether by means of a collar adapted to slidably engage the spear and the gun is fixedly connected to the other end of the tether. The spear is loaded upon the gun with the collar adjacent the forward extremity of the spear. Upon firing, the spear is propelled forwardly through the collar. The collar is retained at the rearward extremity by a stop means, and one extremity of the flexible tether is pulled forward with the spear. After the forward travel of the spear has been achieved by means of impact with a fish or other object or by means of limited travel by the tether means, the spear may be retrieved with or without an impaled fish. Other spear guns such as that disclosed in U.S. Pat. No. 5,145,740 to Boykin concerns a similar spear gun having a coiled spring tether means.

Yet other spear gun apparatus have been disclosed which employ a spiral wound reel from which tether line is deployed and retrieved. Although the aforesaid spear and harpoon devices disclose tether means and propulsion means, no spear propelling apparatus has heretofore been disclosed which utilizes a standard type fishing rod and reel to propel a tethered fishing spear in a whipping-cast motion.

It is therefore an object of the present invention to provide a spear fishing apparatus utilizing a fishing rod and reel tethered to an elongate barbed spear.

It is another object of the present invention to provide a spear fishing apparatus of the aforesaid nature having a collar slidably connecting the tether to the spear.

It is a further object of this invention to provide a spear fishing apparatus of the aforesaid nature having a spear which may be simply retrieved by means of a geared fishing reel.

It is yet another object of this invention to provide a spear fishing apparatus of the aforesaid nature which is simple to operate, effective, durable and amenable to low cost manufacture.

It is still another object of the present invention to provide a spear fishing method involving the forward propulsion of a tethered spear from a fishing rod.

These and other beneficial objects and advantages will be apparent from the following description.

SUMMARY OF THE INVENTION

The above and other beneficial objects and advantages are accomplished in accordance with the present invention by a spearfishing apparatus comprised of:

a) a fishing rod comprised of an elongate shaft tapered between stiff proximal and flexible distal extremities, said rod having a grip region associated with said proximal extremity and a guide region associated with said distal extremity, said grip region having a reel mounting seat and tactile grip surface, said guide region having a plurality of line guide means orthogonally disposed to said shaft and having a corresponding plurality of aligned line passage apertures, b) a fishing reel having a line storage spool, line retrieval and release mechanism, resistive line drag system, and reel mounting foot adapted to be affixed to said reel seat, c) a fishing line spirally wound upon said spool and having a free extremity adapted to be deployed and retrieved through said guide apertures, d) a collar of annular shape having a central cylindrical bore and means for securing the free extremity of said line, and e) a spear having a shaft elongated between forward and rear extremities and adapted to slide in close proximity within said cylindrical bore, said shaft having forward and rear stop means adapted to limit longitudinal travel of said shaft with respect to said collar, said spear having a barbed point associated with said forward extremity and a plurality of flights orthogonally emergent from said rear extremity in uniformly spaced radial array.

The spearfishing method of this invention employs the aforesaid apparatus, and further comprises:

1) propelling the spear by a casting motion of said fishing rod wherein said distal extremity is initially positioned rearwardly from the user and then brought forcefully forward in a whipping motion, 2) said collar being initially in abutment with said forward stop means, thereby transmitting propulsive force to said spear, 3) said collar traveling rearward along said shaft while said spear is in forward motion until contact with said rear stop means is achieved, thereby pulling said free line extremity along the path of said spear in rapid deployment from said spool, and 4) retrieving said spear by use of said fishing reel.

In a preferred embodiment, the spear is constructed of small diameter flexible stainless steel rod approximately ten inches in length. The flights may be in the form of feathers or preferably resilient plastic blades such as those commonly used upon arrows. The barb may be retractable in nature.

Preferable rod construction is of tubular fiberglass having a stiff grip region and "fast" tapered guide region, thereby allowing maximum velocity to be produced in a whipping cast motion. The guides may have a wear surface of ceramic or other material to minimize frictional interaction with the line.

The line may be of monofilament or braided construction having a test strength between 20 and 80 pounds. A leader section may be interposed between said free extremity and said collar, said leader being fabricated from wire, monofilament, or dacron and having a test strength between 30 and 90 pounds.

The collar may be constructed of stainless steel, other metals, or of an engineering grade resin.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
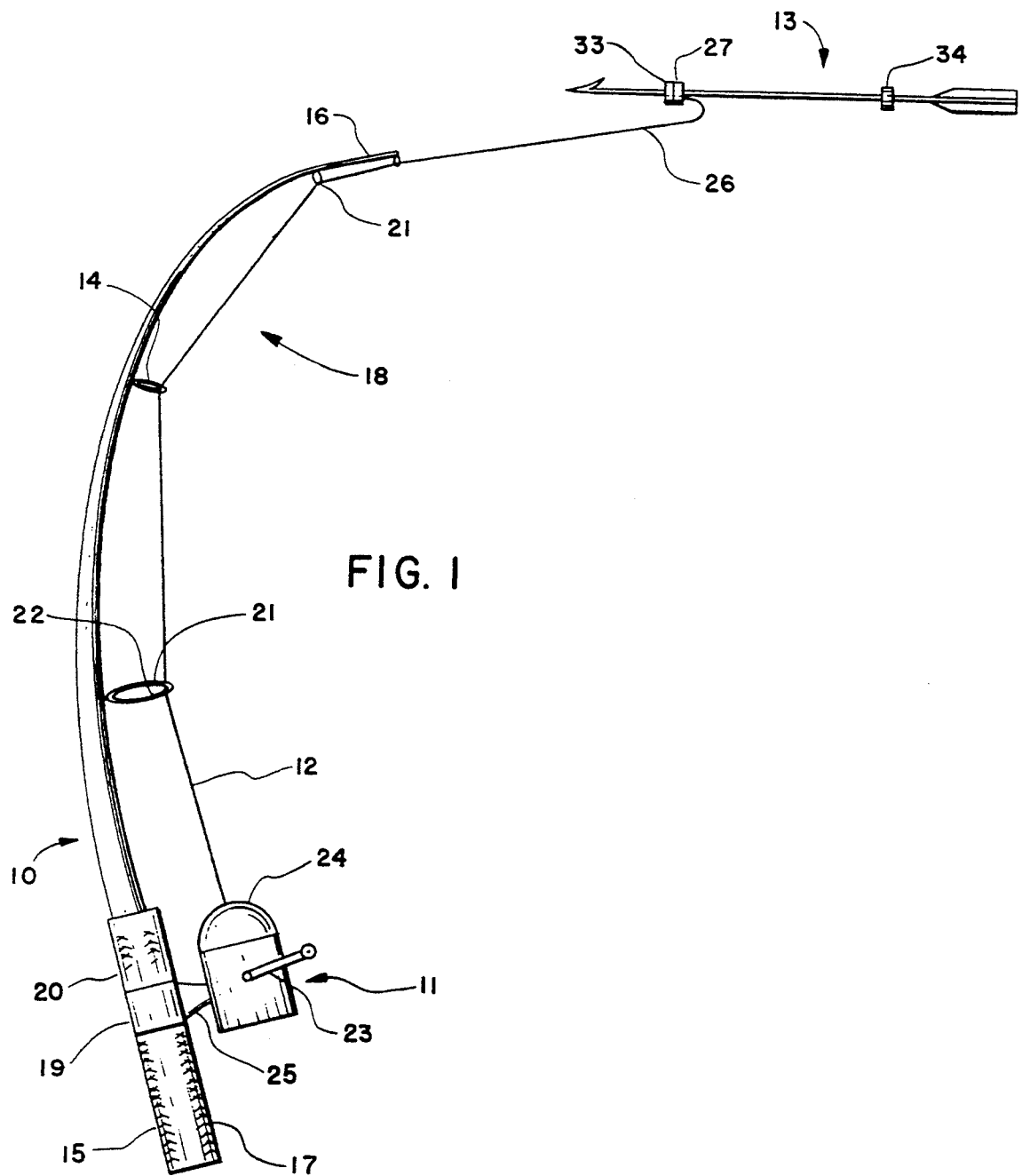
FIG. 1 is a perspective side view of an embodiment of the spear fishing apparatus of the present invention shown during casting.
Figure 2:
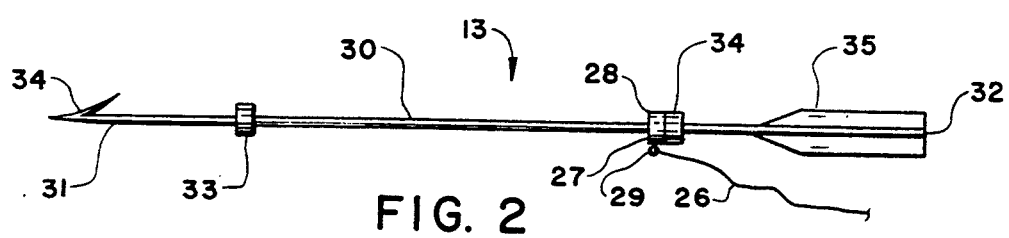
FIG. 2 is an enlarged fragmentary side view following casting.

Referring to FIGS. 1-2, an embodiment of the spearfishing apparatus of the present invention is shown comprised of fishing rod 10 having reel 11 which stores lines 12, and spear 13 secured by line Said fishing rod is further comprised of elongated shaft 14 tapered between stiff proximal and flexible distal extremities 15 and 16, respectively. A grip region 17 is associated with said proximal extremity, and guide region 18 is associated with said distal extremity. A peel mounting seat 19 and tactile grip surface 20 are disposed upon said grip region. Said guide region has a plurality of line guides 21 orthogonally disposed to said shaft and having a corresponding plurality of aligned circular apertures 22 whose diameters progressively diminish with increased distance from the grip region.

Said fishing reel is of conventional design having a line storage spool, line retrieval and release mechanism 23 and 24, respectively, resistive line drag system, and mounting foot 25 adapted to be removably affixed to said reel seat.

Line 12 is spirally wound upon said spool, and has a free distal extremity 26 adapted to be axially deployed and retrieved through the circular apertures of guides 21.

A collar 27 of annular shape and having a circular bore 28 is slidably disposed upon spear 13 which penetrates said bore. Attachment means in the form of eyelet 29 in collar 27 permits the terminal extremity of line 12 to be secured to said collar.

Spear 13 is comprised of a shaft 30 of circular cross-sectional configuration and terminating in forward and rear extremities 31 and 32, respectively. Forward and rear stop means 33 and 34, respectively are affixed to the shaft adjacent said forward and rear extremities, respectively. The function of said stop means is to limit the travel of collar 27 upon shaft 30. A barbed point 34, is associated with forward extremity 31 forwardly of forward stop means 33. A plurality of flights 35 are orthogonally emergent from the shaft adjacent said rear extremity and rearwardly from rear stop means 34. Said flights are comparable to the feathers generally employed upon conventional arrows for the purpose of stabilizing the flight of the arrows. The flights, which are preferably of plastic or rubber, are compliant, thereby permitting the spear to be pulled through a struck target such as a fish.

In operation, the fishing rod is held by the user in a substantially vertical position, applying both hands to grip region 17, preferably one hand below the reel and the second hand above the reel. The distal extremity is initially positioned rearwardly of the user, and is then brought sharply forward. Such action causes the upper portion of the fishing rod to flex and impart a whip-like force upon collar 27 which rests in abutment with forward stop means 33. The spear is accordingly propelled forwardly toward the target. During the flight of the spear, collar 27 slides into abutment with rear stop means 34, and line is pulled from the reel. The spear is retrieved by winding the line back onto the reel. The length and weight of the spear may vary to accommodate different rod types and fish sizes.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Spearfishing apparatus comprised of:
   a) a fishing rod comprised of an elongate shaft tapered between stiff proximal and flexible distal extremities, said rod having a grip region associated with said proximal extremity and a guide region associated with said distal extremity, said grip region having a reel mounting seat and tactile grip surface, said guide region having a plurality of line guides having a corresponding plurality of aligned line passage apertures,
   b) a fishing reel having a line storage spool, line retrieval and release mechanism, resistive line drag system, and reel mounting foot adapted to be affixed to said reel seat,
   c) a fishing line spirally wound upon said spool and having a free extremity adapted to be deployed and retrieved through said line passage apertures,
   d) a collar of annular shape having a central cylindrical bore and means for securing the free extremity of said line, and e) a spear having a shaft elongated between forward and rear extremities and adapted to slide in close proximity within said cylindrical bore, said shaft having forward and rear stop means adapted to limit longitudinal travel of said shaft with respect to said collar, said spear having a barbed point associated with said forward extremity and a plurality of flights attached to said rear extremity.

2. The apparatus of claim 1 wherein said fishing rod is of tubular fiberglass construction having a stiff grip region and fast tapered guide region.

3. The apparatus of claim 2 wherein said line has a tensile breaking strength between 20 and 60 pounds.

* * * * *